(12) United States Patent
Beebe et al.

(10) Patent No.: US 6,675,293 B1
(45) Date of Patent: Jan. 6, 2004

(54) AUXILIARY PROCESSOR MANAGES FIRMWARE PERSONALITIES WHILE BORROWING HOST SYSTEM RESOURCES

(75) Inventors: William Eldred Beebe, Round Rock, TX (US); Christopher L. Canestaro, Austin, TX (US); Robert Allan Faust, Austin, TX (US); Craig Henry Shempert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 09/704,597

(22) Filed: Nov. 2, 2000

(51) Int. Cl.[7] .............................. G06F 9/00; G06F 1/26
(52) U.S. Cl. ............................ 713/1; 713/100; 713/300
(58) Field of Search ............................... 713/1, 2, 100, 713/300, 324

(56) References Cited

U.S. PATENT DOCUMENTS

| | | | | |
|---|---|---|---|---|
| 5,671,281 A | * | 9/1997 | Campbell et al. | ........... 713/100 |
| 5,781,434 A | * | 7/1998 | Tobita et al. | ................. 700/79 |
| 6,195,750 B1 | * | 2/2001 | Ellsworth | .................... 713/100 |
| 6,266,721 B1 | * | 7/2001 | Sheikh et al. | ............... 710/100 |
| 6,507,906 B1 | * | 1/2003 | Criddle et al. | ................. 713/2 |

* cited by examiner

*Primary Examiner*—Dennis M. Butler
(74) *Attorney, Agent, or Firm*—Duke W. Yee; Mark E. McBurney; Stephen R. Loe

(57) ABSTRACT

A method and system comprising at least one service processor that is connected to memory and a host system. Additionally, the host system includes at least one host input resource device, such as, for example, a floppy disk, and an interface connecting the host input resource device to the service processor. The interface provides a means for the host input resource device to update, restore, or initialize host system parts or images. In one embodiment, this invention disconnects the host input resource device from main system power and connects it to auxiliary standby power. Thus, the host input resource device makes possible a less costly, less burdensome update of any piece of a data processing system.

17 Claims, 2 Drawing Sheets

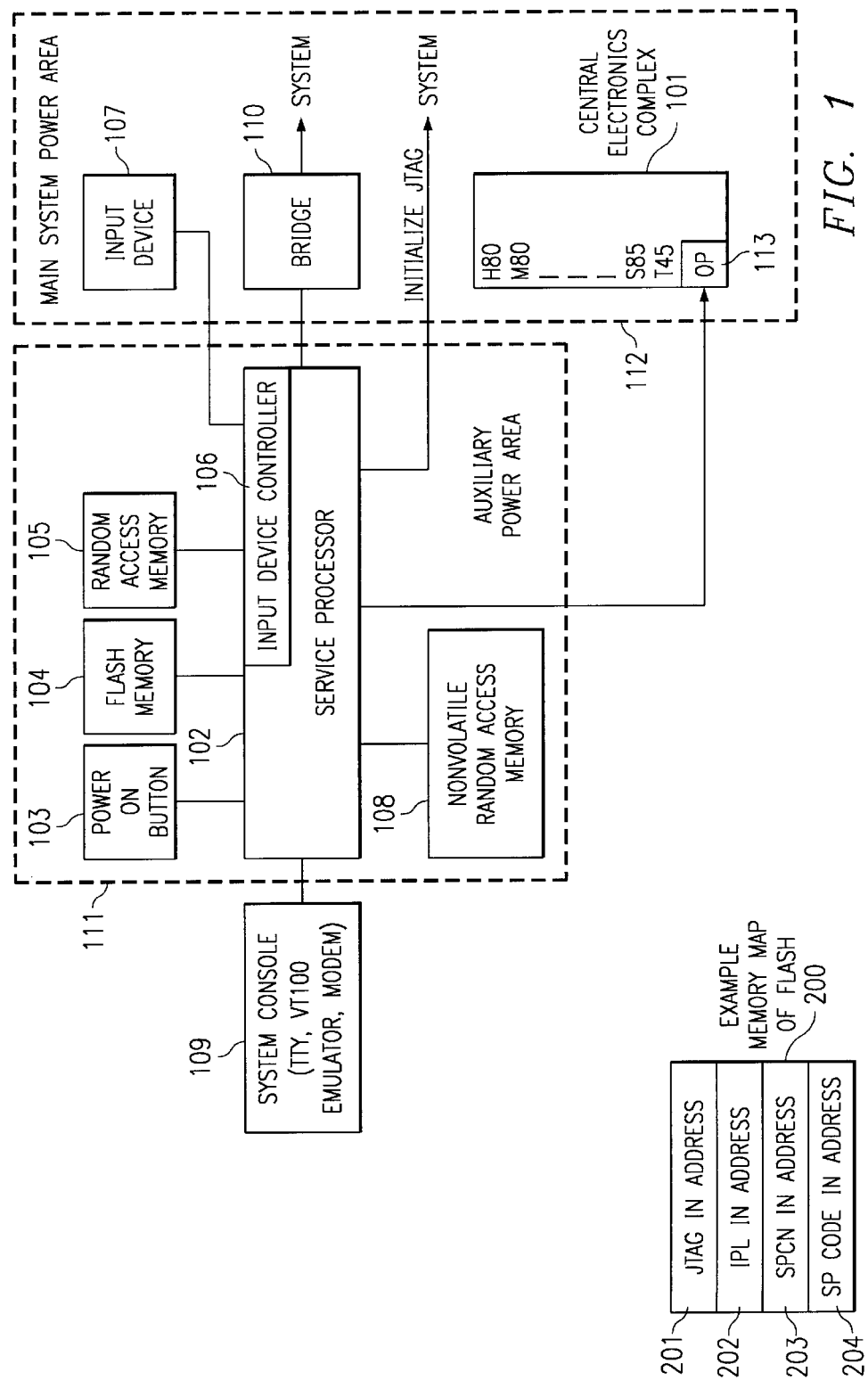

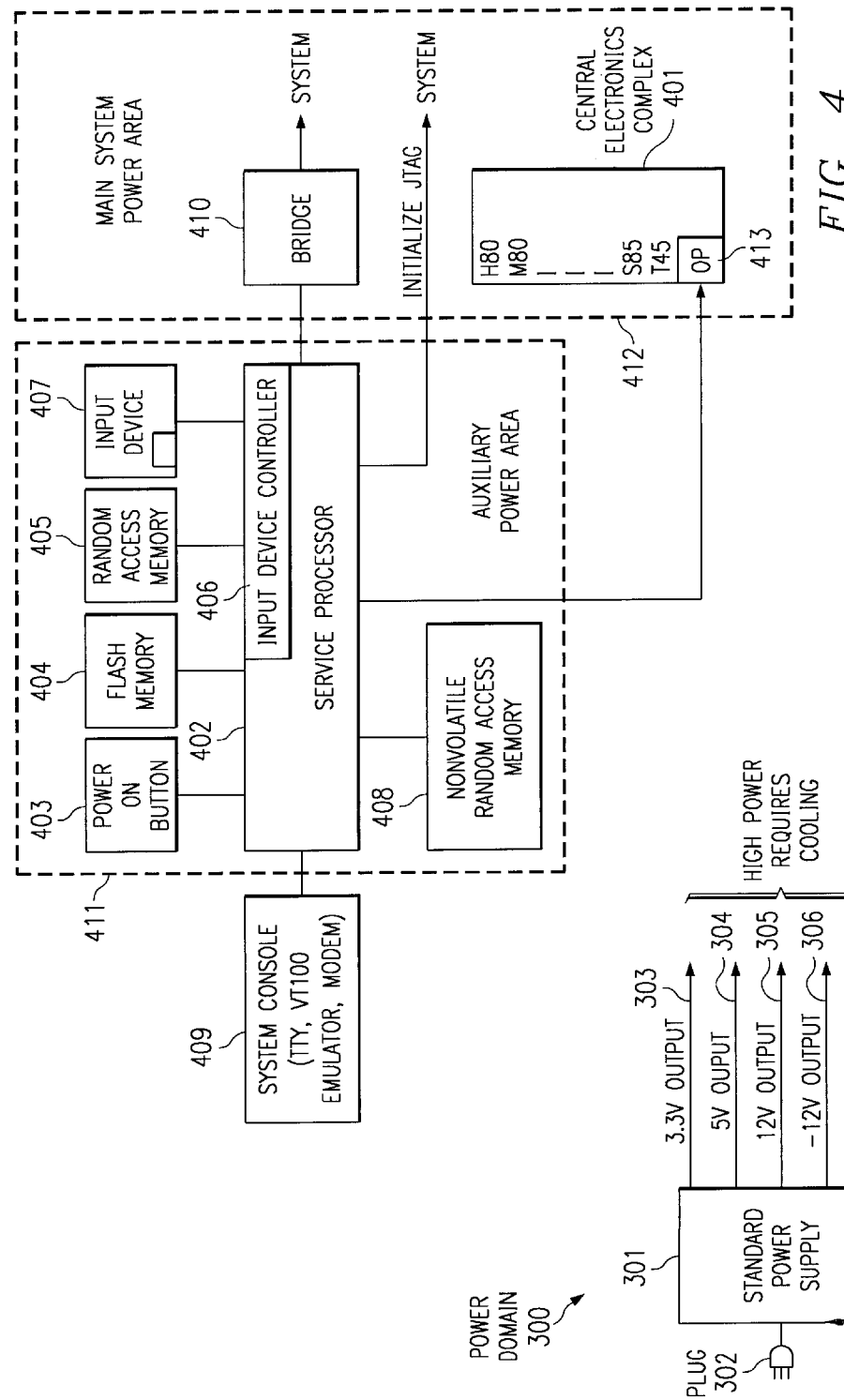

AUXILIARY PROCESSOR MANAGES FIRMWARE PERSONALITIES WHILE BORROWING HOST SYSTEM RESOURCES

BACKGROUND OF THE INVENTION

1. Technical Field

The present invention relates generally to the field of computer power and, more specifically, to methods and systems for avoiding powering up a host system to change code in an auxiliary processor.

2. Description of Related Art

Data processing systems that work with central electronics complexes (CECs) face difficulty in updating equipment. An implementation of a new CEC model, which is mostly processors and memory, requires a code update in the data processing system's flash module. CEC models have a plurality of part numbers because programming within each model is different. Typically, a new CEC must be fully operational for its corresponding flash module to be updated, though the CEC cannot update it. When updating the CEC, it is important to note that the new CEC cannot initialize until new instructions in the form of an image have been provided to the service processor. Plus, the plurality of part numbers also exist because each CEC model requires a service processor mate, a new image for the service processor, and a new flash memory map. Every CEC image necessary (e.g., RISC System/6000 Model M80 or model H80) must be accommodated with another appropriate mating flash module and service processor. Thus, because none of these parts currently update each other, to update any singular part requires an entire system update of a new flash memory module, a new CEC model, and a new service processor. And, the parts must be shipped together to mate perfectly. Keeping each combination of parts stocked in the field is cumbersome. Therefore, a method and system for making a system update more convenient, efficient, and inexpensive without the need for powering up the main system would be desirable.

SUMMARY OF THE INVENTION

The present invention applies to a host system that includes a service processor that is connected to the memory of said host system. Additionally, the host system includes at least one host input resource device, such as, for example, a floppy disk along with its controller, and an interface connecting the host input resource device to the service processor. The interface provides a means for the host input resource device to update, restore, or initialize host system parts or images. In one embodiment, this invention disconnects the host input resource device from main system power and connects it to auxiliary standby power. Thus, the host input resource device makes possible a less costly, less burdensome update of any piece of a data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a block diagram of a data processing system that utilizes a central electronics complex in accordance with prior art;

FIG. 2 depicts a block diagram of an example memory map of flash memory in accordance with the present invention;

FIG. 3 depicts a block diagram of a power supply of a data processing system in accordance with the present invention; and FIG. 4 depicts a block diagram of a data processing system that utilizes a central electronics complex in accordance with the present invention.

DETAILED DESCRIPTION OF THE PREFERRED EMBODIMENT

With reference now to FIG. 1, a block diagram of a data processing system that utilizes a central electronics complex (CEC) is depicted in accordance with the present invention. This invention is not limited to but is conducive to logical partitioning (LPAR) as one approach to accommodate multiple operating systems.

Data processing system 100 includes a service processor 102 to initialize software of data processing system 100, using JTAG scan loops to load any operating systems into memory, and monitor any hardware. Service processor 102 also manages fans to maintain temperature of data processing system 100. Service processor 102 is not necessarily required for data processing system 100; instead, service processor 102 could be a well-behaved or privileged copy of an operating system, or an extraneous control system. In this embodiment, it is a service processor that initializes system 100.

Service processor 102 includes several parts of which the following is not an exhaustive list: power on button 103, flash memory 104, random access memory 105, and non-volatile random access memory 108. Service processor 102 is connected to an input device controller 106 that is connected to an input device 107. The device controller 106 is within the auxiliary power area 111, and the input device itself, is within the main system power area 112. The cabinet containing power on button 103 includes an operator (OP) panel 113 to post error codes and conduct some small input/output operations. Service processor 102 is also connected to a system console 109, bridge 110, and central electronics complex 101. Input device 107 does not necessarily have to be writable; in fact, as examples, input device 107 could be a CD-ROM, floppy disk drive, hard drive, or the like. System console 109 could be for example, a standard terminal interface (TTY), VT100 emulator, or modem.

Service Processor 102 could support multiple CECs, such as, for example, CEC 101. CEC 101 is an entity, made up of processors and memory and having different memory controllers, budgets, and needs. CEC 101 can be, for example, a RISC System/6000 Model H80 or Model M80, both of which are products of the International Business Machines Corporation of Armonk, N.Y. and which are different system boxes. In addition to several different models of CECs, several different images are applicable depending on which CEC input device the TTY is. System console 109 determines which image to use.

Updating data processing system 100 would be easier using an input device to import computer programs. Currently, updating data processing system 100 is complicated, especially updating service processor 102 or CEC 101. Updating service processor 102 requires engineering any changes from scratch, i.e., physically replacing the service processor 102. Updating CEC 101 involves a new CEC 101 device, a new flash memory 104, and a new image to project to system console 109. It would be desirable to have a programmable image generic to all CEC models, a method of reprogramming the same flash memory hardware, and simply replacing one part which is the new CEC model per CEC update.

Prior art updated CECs by replacing flash memory with a new service processor card, a new flash memory part plugged into its socket, or wheeling a programming machine (such as a PC) over that would input programmable update changes, such as, changing the source processor's image, and requiring each part to be functionally updated at once without latitude to replace a few new parts and allow them to update any other parts necessary.

System console 109 has its own power source separate from both auxiliary power area 111 and main system power area 112. Auxiliary power area 111 includes service processor 102, which includes at least a power on button 103, flash memory 104, random access memory 105, an input device controller 106 that is connected to an input device 107, and nonvolatile random access memory 108. Alternatively, main system power area 112 includes, at least, bridge 110 and central electronics complex 101.

It would be less costly to program new changes via software because each part costs thousands of dollars to replace. Yet, if changes were programmed, cost involved would reduce to a negligible amount. In addition, time would be saved. It would be desirable for only one part to be stocked in the field, as well, rather than stocking a part for each scenario possible based on each image possible.

With reference now to FIG. 2, a block diagram of an example memory map of flash memory is depicted in accordance with the present invention. Flash 200 may be implemented as, for example, flash memory 104 in FIG. 1. FIG. 2 illustrates just one of many different flash memory maps possible per CEC model.

With reference now to FIG. 3, a block diagram of a power supply of a data processing system, is depicted in accordance with the present invention. Power Domain 300 may be implemented as, at least, a combination of main system power area 111 and auxiliary power area 112 in FIG. 1. Standard power supply 301 emits 3.3 volts on output 303, 5 volts on output 304, 12 volts on output 305, and −12 volts on output 306. Outputs 303–306 are high power that requires cooling. Auxiliary output 307 is alive when plugged in the wall, and system 100 does not have to be powered on. Auxiliary output 307 is always alive because it carries lower currents than outputs 303–306. FIG. 1 explained that service processor 102 and input device 107 are connected to the different power areas, which is auxiliary system power area 111 and main system power area 112 respectively. Service processor 102 can receive input programming changes only if input device 107 is powered on as well. Thus, this invention separates input device 107 from main system power area 112 and includes input device 107 in auxiliary power area 111 by disconnecting input device's 107 power input from 5 v output 304 and connecting input device's 107 power input to auxiliary output 307 of standard power supply 301.

With reference now to FIG. 4, a block diagram of a data processing system that utilizes a central electronics complex is depicted in accordance with the present invention. FIG. 4 illustrates a block diagram of data processing system 400 with input device 407 included in auxiliary power area 411. Disconnecting input device's 407 power input in FIG. 3 from 5 v output 304 and connecting input device's power input to auxiliary output 307 of standard power supply 301 causes input device 407 to be included in auxiliary power area 411.

Connecting the input device to an auxiliary power area provides numerous advantages. Using the presently claimed invention, a new CEC model's mating flash memory map and service processor image may both be updated without attaching the new CEC model to the system first and the service processor update source may be shipped separately. Plus, only the new CEC model must be stocked in the field rather than one part per each combination possible.

Accordingly, the service processor and host are sharing resources. The input device controller borrows a system resource while the system is not necessarily functioning. Thus, by moving an input device from system to auxiliary power domain, updates are inexpensive, convenient, and efficient.

Using the presently claimed invention, service processor 402 can utilize input device 407 while data processing system 400 is not updating flash with it. Thus, service processor 402 or any sub-operating system of data processing system 400 is now able to borrow a system resource to help manage service. Now, the service processor and host are sharing resources.

Also, as an alternative input device, power up button 403 includes an operator (OP) panel 413 to post error codes and conduct some small input/output operations. A user may program changes in flash memory and CEC images via OP panel 413.

Additionally, with this invention service processor 402 does not need to be operating while source processor code is moved to RAM or flash memory is updated.

Also, CEC is no longer all one box; therefore, service processor 402 and operator panel 413 separate. CEC does not necessarily have to be attached to update both because they are separately run and because CEC is now generic.

With an input device 407 on standby power, updating system 400 requires fewer parts. Also, not as many specified part mates must ship. With the ability to input programming changes, parts are able to be more generic hardware and allow software uniqueness to be handled by an input device. For example, a manufacturer could ship a separate CEC from a shipment of source processor image updates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

What is claimed is:

1. A data processing system, comprising:

a service processor;

a memory coupled to the service processor;

a host system coupled to the service processor and comprising at least one host input resource device; and an interface connecting the host input resource device to the service processor; wherein:

the interface provides a means for the host input resource device to perform at least one of the following functions: update, restore, and initialize service processor images and memory maps;

and the host input resource device is powered from the same power domain as the service processor.

2. The data processing system of claim 1, wherein the host system is not required to be powered up to update the service processor images and memory maps.

3. The data processing system of claim 1, further comprising at least one central electronics complex connected to the service processor.

4. The data processing system of claim 1, wherein the power domain of the service processor is auxiliary power.

5. The data processing system of claim 1, wherein update comprises restoring the service processor images.

6. The data processing system of claim 1, wherein update comprises initializing the service processor images.

7. The data processing system of claim 1, wherein the host system is on a separate power domain than the service processor.

8. The data processing system of claim 1, wherein at least one floppy disk serves as the at least one host input resource device.

9. The data processing system of claim 8, wherein the floppy disk utilizes standby power.

10. A data processing system, comprising:

a service processor coupled to a host system, wherein the service processor is powered from an auxiliary power domain and the host system is powered from a main power domain;

a memory component for storing service processor firmware powered from the auxiliary power domain coupled to the service processor; and an input device powered from the auxiliary power domain coupled to the service processor, wherein updates to the service processor firmware may be made without supplying power to the main power domain.

11. The data processing system as recited in claim 10, wherein the firmware comprises service processor images and memory maps.

12. The data processing system as recited in claim 10, wherein the input device comprises a device to read data from a computer readable media.

13. The data processing system as recited in claim 12, wherein the computer readable media is a portable computer readable media.

14. The data processing system as recited in claim 10, wherein the input device is a disk drive.

15. The data processing system as recited in claim 10, wherein the input device is a CD-ROM drive.

16. The data processing system as recited in claim 10, wherein the input device is a DVD-ROM drive.

17. The data processing system as recited in claim 10, wherein the input device is a floppy disk drive.

* * * * *